Figure 1:
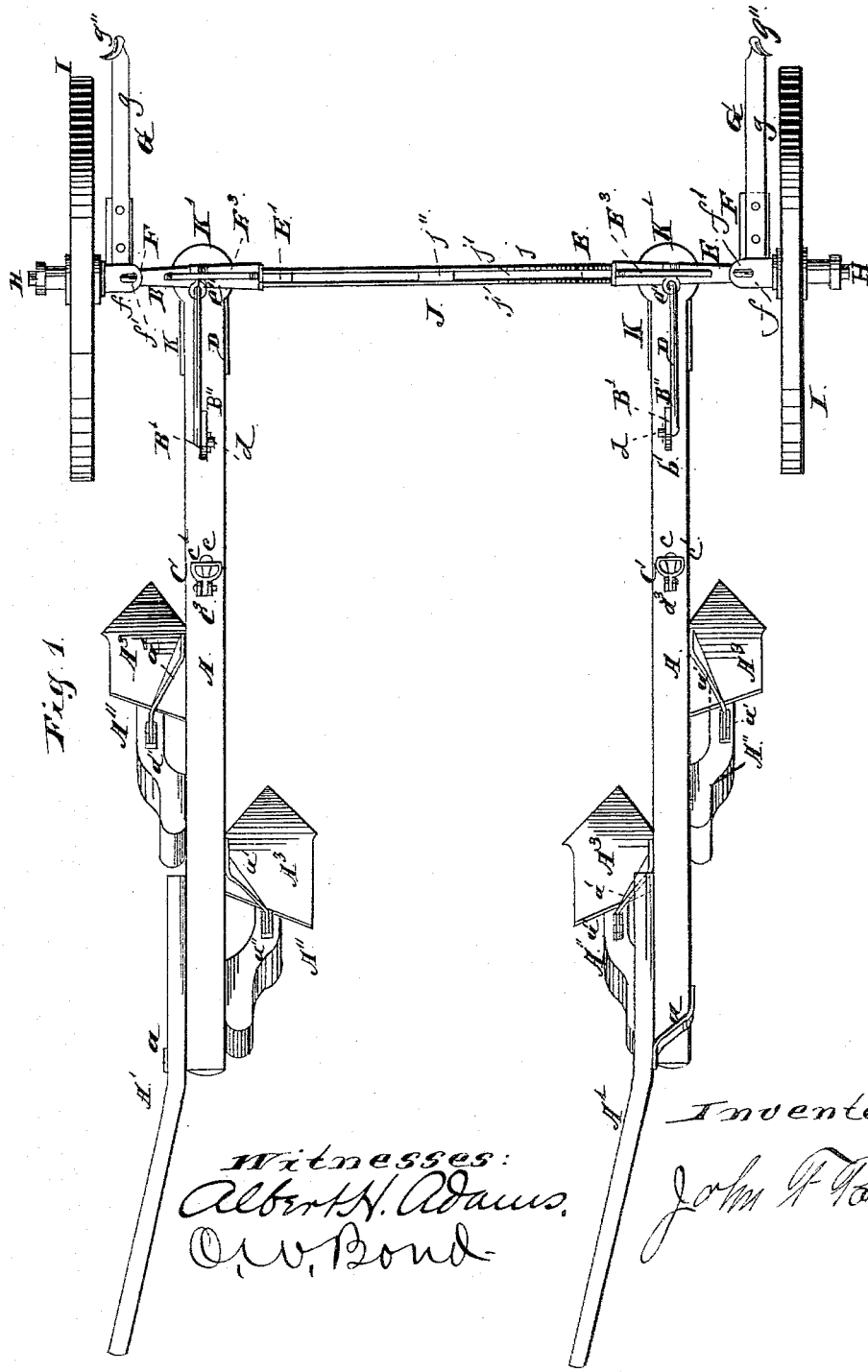

(No Model.)  5 Sheets—Sheet 1.

J. F. PACKER.
CULTIVATOR.

No. 323,440.  Patented Aug. 4, 1885.

Witnesses:
Albert H. Adams.
O. W. Bond

Inventor:
John F. Packer

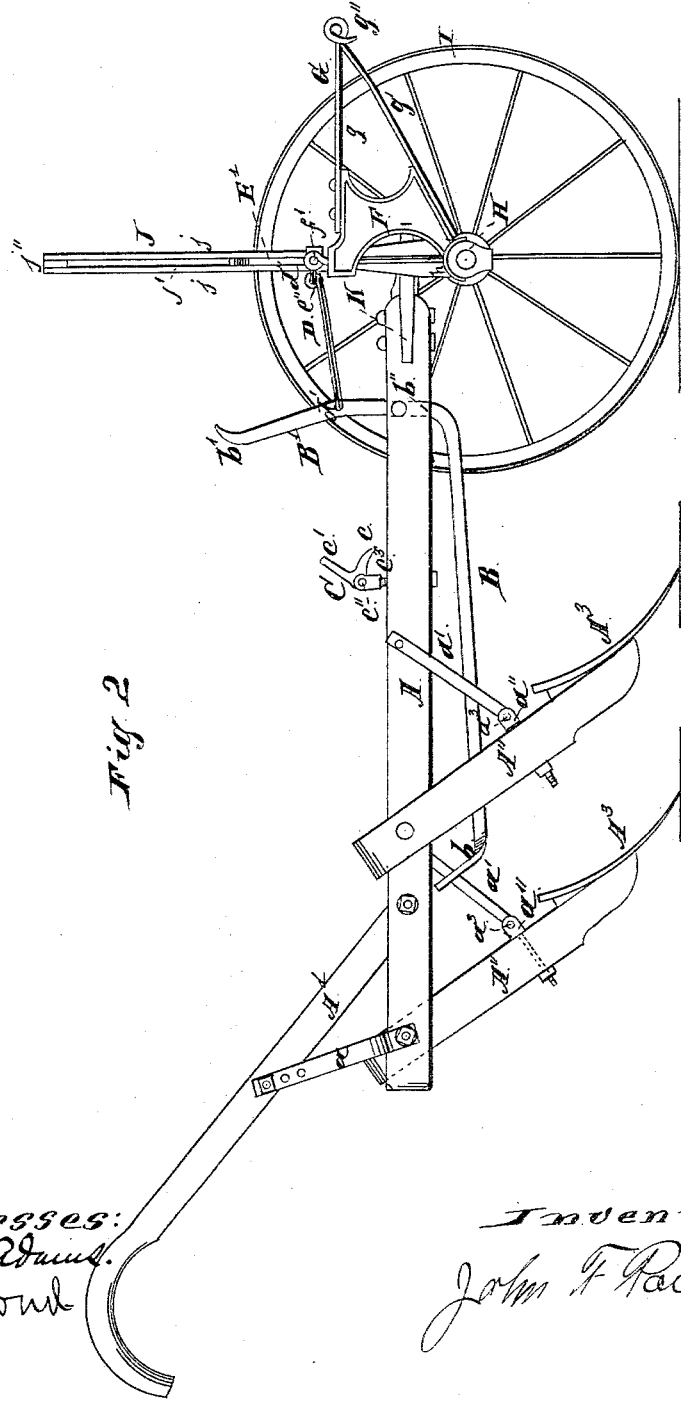

(No Model.)  J. F. PACKER.  5 Sheets—Sheet 3.
CULTIVATOR.
No. 323,440.  Patented Aug. 4, 1885.
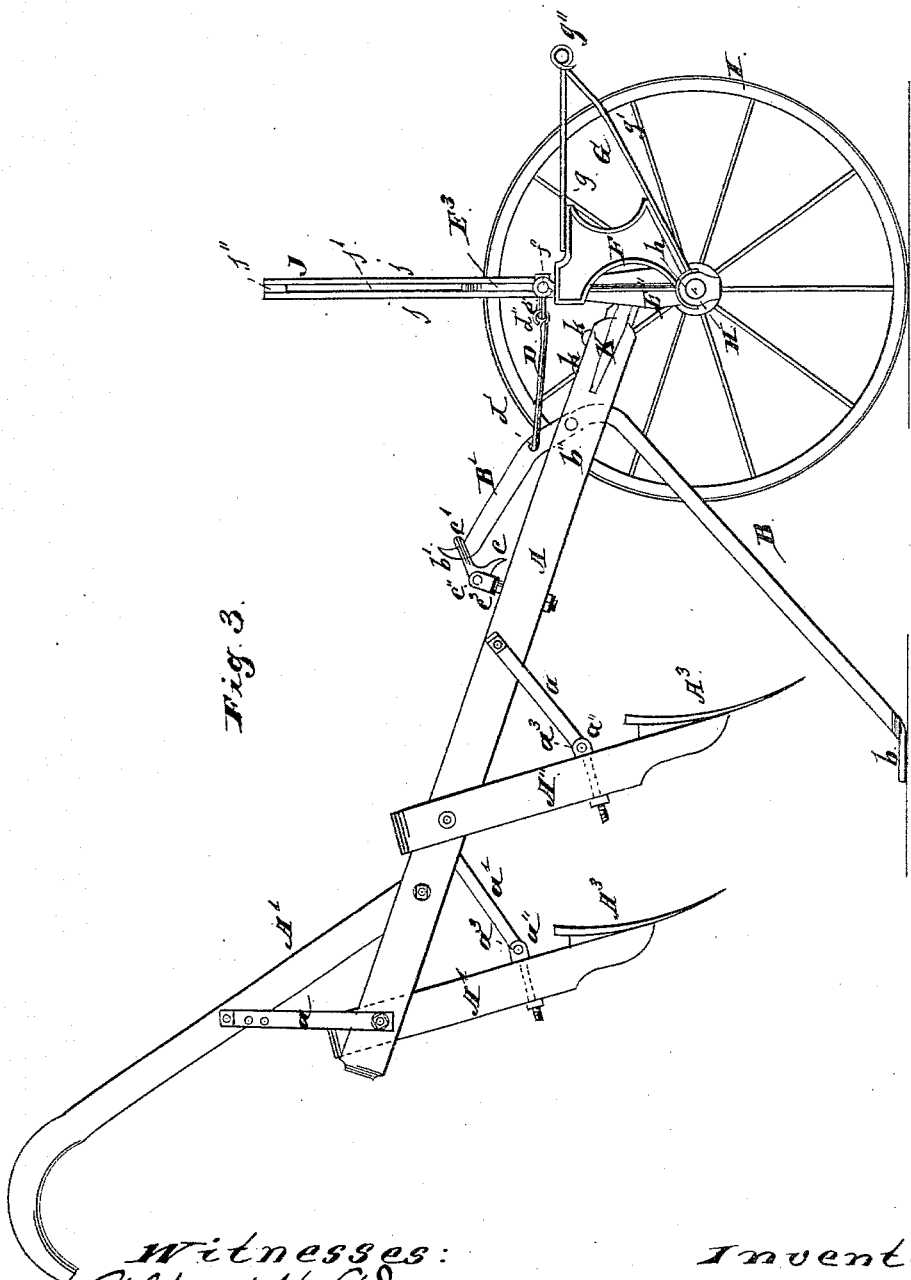
Witnesses:
Albert H. Adams
O. W. Bond
Inventor:
John F. Packer (No Model.)
5 Sheets—Sheet 4.
J. F. PACKER.
CULTIVATOR.
No. 323,440.
Patented Aug. 4, 1885.
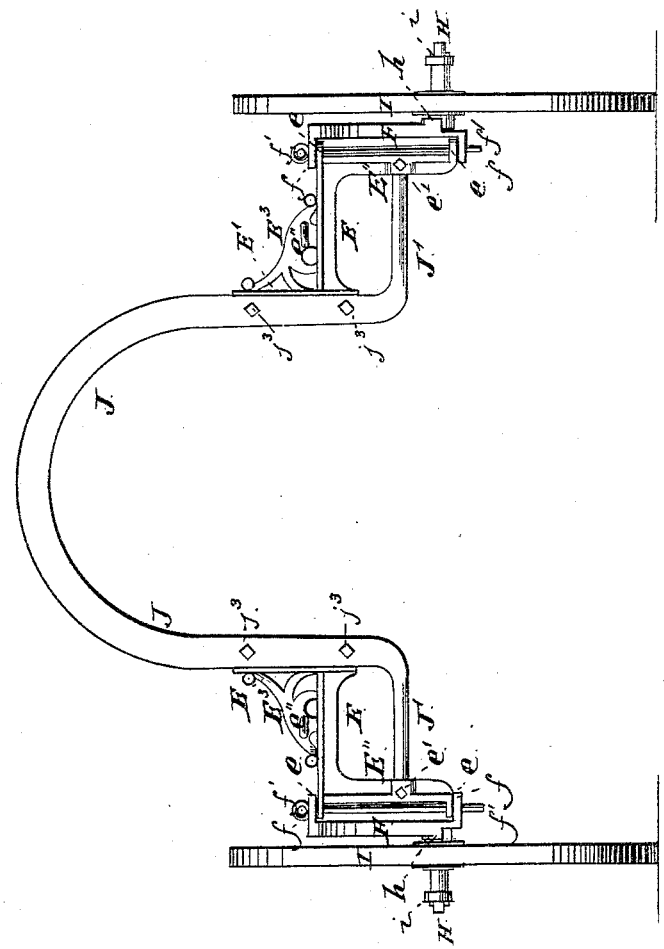
Witnesses:
Albert H. Adams.
O. W. Bond.
Inventor:
John F. Packer (No Model.)   5 Sheets—Sheet 5.
J. F. PACKER.
CULTIVATOR.
No. 323,440.  Patented Aug. 4, 1885.
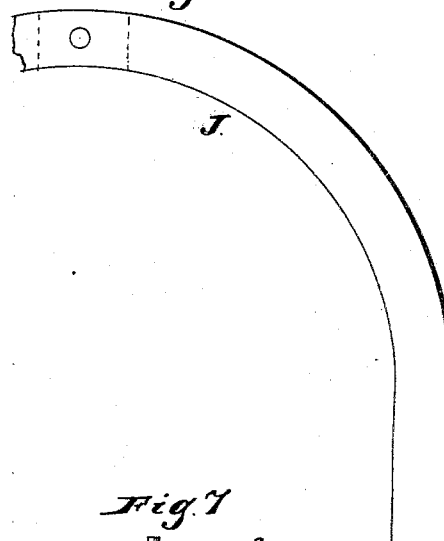
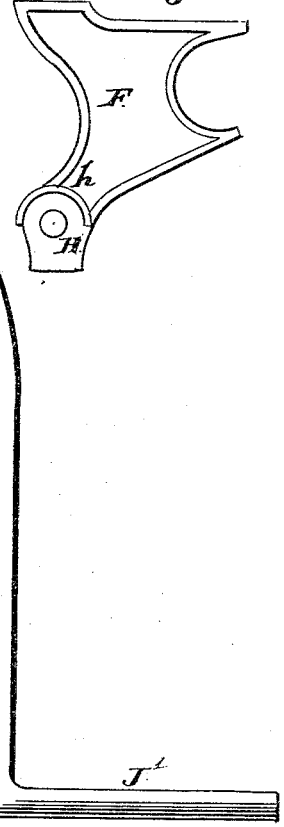
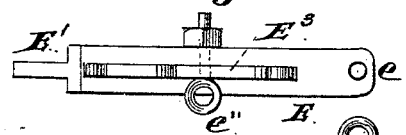
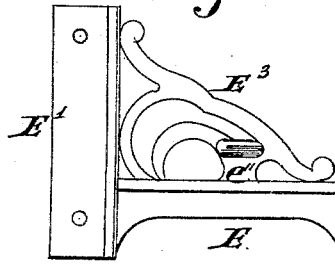
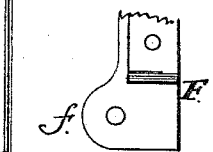
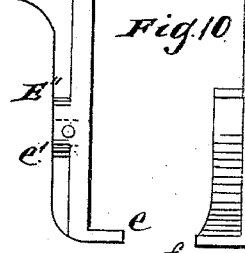
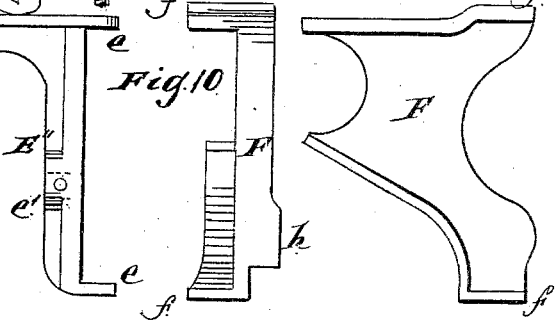
Witnesses
Albert H. Adams
O. W. Bond
Inventor:
John F. Packer

UNITED STATES PATENT OFFICE.

JOHN F. PACKER, OF CHICAGO, ILLINOIS, ASSIGNOR TO DAVID BRADLEY MANUFACTURING COMPANY, OF SAME PLACE.

CULTIVATOR.

SPECIFICATION forming part of Letters Patent No. 323,440, dated August 4, 1885.

Application filed October 2, 1884. (No model.)

*To all whom it may concern:*

Be it known that I, JOHN F. PACKER, residing at Chicago, in the county of Cook and State of Illinois, and a citizen of the United States, have invented a new and useful Improvement in Cultivators, of which the following is a full description, reference being had to the accompanying drawings, in which—

Figure 1 is a top or plan view; Fig. 2, a side elevation showing the beam down, the wheel on one side being removed; Fig. 3, a similar view to Fig. 2, showing the beam elevated; Fig. 4, a rear elevation with the beams removed; Fig. 5, a detail showing one side of the arch; Fig. 6, a cross-section of the arch; Fig. 7, a top view of the bracket; Fig. 8, a side elevation of the bracket; Fig. 9, a detail showing the pin connecting the wheel and draft-plate with the bracket; Fig. 10, an edge elevation of the rear of the wheel and draft-plate; Fig. 11, a detail, being a top or plan view of the wheel and draft-plate; Fig. 12, an elevation showing the inner side of the wheel and draft-plate; Fig. 13, an elevation showing the outer side of the wheel and draft-plate.

This invention relates to certain improvements in that class of cultivators known as "tongueless," some of which, however, can be applied to other classes of cultivators, and has for its objects to control and automatically lock the drag-bar by the raising of the beam, to retain the arch or frame in a vertical position whether the beams are up or down, to improve the means for the attachment of the draft, to readily adjust the shovels to run deep or shallow, and to improve generally the construction and operation of the machine as a whole; and its nature consists in the several parts and combinations of parts hereinafter described, and pointed out in the claims, for attaining the objects sought.

In the drawings, A represents the plow-beams, one for each side of the machine, and each having a handle, A', pivotally connected at its lower end by a bolt or otherwise to the beam, and held in place by a brace-bar, $a$, running from the beam to the handle, which bar at its upper end is provided with a series of holes by means of which the handle can be adjusted to suit the operator, and each beam, as shown, carries two shovel-standards, A'', to the lower ends of each of which is secured a shovel, $A^3$, of the usual construction. Each standard A'' is braced by a bar, $a'$, the upper end of which is bolted or otherwise attached to the beam, and the lower end of which lies in a slot in the head of a bolt, $a''$, which bolt passes through the standard, and to which the bar $a'$ is attached by a wooden break-pin, $a^3$. The standards A'' are located on opposite sides of the beam, the forward one being on the outer side, as usual; and as the draft is against the shovels it will be seen that by means of the bar $a'$ and the bolt $a''$ the standards can be set at different inclinations to cause the shovel to run deeper or shallower. The nearer vertical the standard stands the deeper the shovel will run, and this adjustment is attained by loosening the nut of the bolt which passes through the standard, so that the standard can be moved back to stand at a less inclination, and tightening the nut to cause the standard to stand at a greater inclination, which adjustment can be readily made by the operator.

B B' are the drag-bars, one for each beam, and each having its portion B provided with a foot or rest, $b$, to run on the ground when the drag-bar is down and the beam raised, as shown in Fig. 3. The upper portion, B', of the drag-bar passes through a vertical slot, B'', formed in the beam in the form of construction shown, and is pivoted in position by a suitable bolt or pin, $b''$, and its upper end, $b'$, is curved slightly and pointed, as shown in Fig. 3, so as to form a hook or catching-point.

C represents catches, one for each beam, and each formed of a foot portion, $c$, and a loop portion, $c'$, and each pivoted by a suitable pin or bolt, $c''$, in the upper end of a support, $c^3$, screwed or otherwise secured to the top of the beam. The catch C is arranged in such relation to the end $b'$ of the drag-bar as that when the loop portion $c'$ is thrown back the end $b'$ will pass the loop and strike the foot $c$, throwing the loop portion forward and over the end $b'$, as shown in Fig. 3; and in case the loop portion $c'$ is thrown forward the curved face of $b'$, striking the top of the loop, will throw the catch back, so as to allow the end $b'$ to pass and strike the foot $c$ and throw the loop $c'$ over the end.

D is a link or rod, one for each drag-bar, and attached to the drag-bar by having its end $d$ turned at right angles, or nearly so, to the main portion and passed through the hole $d'$ in the drag-bar, the end being held after being passed through by a locking-pin or other suitable means. The forward end of the link or rod D has an eye, $d''$, to interlock with an eye, $e''$, on the frame-bracket, so as to connect the rod or link with the frame to allow the beam perfect freedom of movement.

E E' E'' E$^3$ are brackets, one for each side of the machine. Each bracket may have the parts forming the same cast or otherwise formed in a single piece, to have the portion E lie horizontal, the portion E' stand vertical upwardly from E, and the portion E'' depend vertically from E, and these parts may be formed, as shown, of plates or flanges, or otherwise, so that each part will have a T shape. At the top and bottom of the vertical portion E'' is an ear, $e$, and this vertical portion has a boss or enlargement, $e'$, on its inner face, in which is an opening. The part E$^3$ of the bracket may be of ornamental shape, as shown, or otherwise, and it may be cast or formed with the other parts, or may be made separate therefrom and suitably secured to the parts E E', and this part E$^3$ has attached thereto the eye or loop $e''$, to which the forward end of the bar or link D is connected.

F is the wheel and draft-plates, one for each side of the machine, and to which the wheel is applied and the draft-bar is attached. Each plate has side ears, $f$, to receive the ears $e$ on the bracket, and through these ears $e\,f$ the pin or connecting-rod $f'$ is passed, connecting the plate F with the bracket in a pivotal manner, so that the plate F is free to swing or turn in and out.

G represents the draft-bars, one for each plate F. The bars are formed of an upper portion, $g$, and an under portion, $g'$, coming together at their forward ends and turned to form a hook, $g''$, as shown in Figs. 1, 2, and 3, to which hook $g''$ the single-tree is attached. The plate F has its under forward edge inclined upward, and its upper forward edge lying horizontal, or nearly so, so that when the draft-bar G is attached the parts $g\ g'$ thereof have the proper relation to each other and to the plate F to produce the correct line of draft for the proper operation of the machine.

H represents the wheel-spindles, one for each plate F, located at the lower end of such plate, and of proper length to receive the wheel-hub; and, as shown, a semi-circular flange, $h$, is formed on the plate F around the wheel-spindle, which flange forms a sand-guard over and around the inner end of the hub.

I represents the wheels, located on the wheel-spindles and held in place by pins $i$ or otherwise.

J is the arch or frame, made, as shown, of two flat bars, $j$, located side by side to leave a space, $j'$, between them, and, as shown, a stay or stiffening piece, $j''$, is provided between the apex of the arch. The lower end of the arch has the two bars brought together, and formed into a round shape, and bent to stand at right angles to the vertical portions of the arch, as shown in Fig. 4, and these round portions J' form the support for the forward end of the plow-beams. The bracket is secured to the arch on each side by passing the part E' into the space between the bars $j$ and securing it in place by bolts $j^3$, or otherwise, and by passing the end of the part J' into the opening in the boss $e'$ and securing it therein by means of a bolt or in some other suitable firm manner, and when together a space is left between the arch and vertical portion E' of the bracket and the horizontal portion E of the bracket and the part J', for the location of the beam-coupling.

K is the beam plate or coupling, one for each beam, and having a head, K', with a suitable opening to receive the part J' of the arch and form the pivot for the vertical movement of the plow-beam. The plate K is bolted or otherwise attached to the plow-beam, and the head K' is slipped onto or over the part J' either before or after the bracket is attached to the arch.

In operation, when the machine is at work, the drag-bar is thrown up, as shown in Fig. 2, and will be held in that position by the connection D between it and the frame, as the draft of the team will serve to hold the drag-bar up, and at the same time the draft on the beam, in connection with the draft of the team and the drag-bar and rod or link D, will maintain the arch in a vertical or nearly vertical position and prevent any liability of its falling forward or back.

When the machine is to be moved from place to place, when not in use, the drag-bar is thrown down automatically as the beam is raised through the rod or bar D and its attachment to the drag-bar and the frame, and as the lower portion of the drag-bar is carried down the upper part will describe an arc of a circle, bringing its end $b'$ into contact with the step $c$, throwing the loop $c'$ over such end and causing the catch to hold the drag-bar firmly in its depressed position, and when the machine is in this condition the arch will be maintained in a vertical or nearly vertical position through the rod or link D and its connection with the drag-bar and frame.

The withdrawal of the catch C from the end $b'$ allows the beam to be dropped, and such downward movement of the beam will throw the ground end of the drag-bar up automatically.

The use of the bolt $a''$ enables the standard to be readily adjusted by the operator to change the shovels to run deep or shallow, as may be required, and by giving the bolt a forked head to receive the end of the brace $a'$ enables a wooden safety-pin to be easily applied.

The wheel and draft-plate F, formed, as shown, with a straight upper part and an inclined lower part, and the form of draft-bar shown, when attached to the draft-plate, furnish a means by which the draft from the team is so directed as to act and keep the plows down to their work, and at the same time draw the machine forward, without causing heavy work for the team; and by making the bracket as shown, with an arch or frame formed of two parallel bars joined together at the end of the vertical portion on each side and extended sidewise, the parts can be readily put together, and when together form a frame which is very strong and at the same time light, and to which the beams and wheels can be readily applied.

The stem of the bolt $a''$ is of greater length than the depth of the standard through which it passes, so as to allow the changing of the nut to lengthen or shorten the bolt, the length being one that will accommodate a change for the lowest running depth of the shovel.

What I claim as new, and desire to secure by Letters Patent, is—

1. The combination, with a beam, A, and drag-bar B B', of the latch C, formed of the foot $c$ and latch $c'$, substantially as and for the purpose specified.

2. The combination of a beam, A, a drag-bar, B B', hinged thereto, an arch or frame, and a rod, D, having a loose connection at one end with the drag-bar and at the other end with the arch or frame, whereby it is adapted to aid in holding the arch or frame in an upright position, substantially as described.

3. The combination of a beam, A, a drag-bar, B B', hinged thereto, an arch or frame, J, a bracket connected with said arch, and a rod, D, having a loose connection at one end with said drag-bar and at the other end to said bracket, substantially as described.

4. The combination, with a cultivator drag-bar having a curved end, $b'$, of a pivoted loop-catch secured to the beam and adapted to fit over the curved end of the drag-bar when the latter is down and hold it firmly in position, substantially as described.

5. The combination of the arch J, having the laterally-extending portions J', and the supporting-bracket composed of the horizontal portion E, the downwardly-extending portion E'', and the upwardly-extending portion E', secured to the arch, substantially as described.

6. The combination of the wheel I, the plate F, having said wheel connected thereto and formed with a horizontal upper edge and upwardly-inclining under edge, and the draw-bar G, formed of the upper and lower portions, $g$ $g'$, secured to the plate F and converging at their forward ends, substantially as described.

7. The combination, with the arch J J' and bracket-support E E' E'', of the plate F, draw-bar G, spindle H, and wheel I, substantially as and for the purpose specified.

JOHN F. PACKER.

Witnesses:
 ALBERT H. ADAMS,
 O. W. BOND.